(12) United States Patent
Vierle et al.

(10) Patent No.: US 8,907,016 B2
(45) Date of Patent: *Dec. 9, 2014

(54) DISPERSING AGENT CONTAINING COPOLYMER MIXTURE

(75) Inventors: Mario Vierle, Wasserburg (DE); Klaus Lorenz, Zangberg (DE); Gerhard Albrecht, Prien am Chiemsee (DE); Christian Scholz, Wald an der Alz (DE); Petra Wagner, Trostberg (DE); Barbara Wimmer, Tacherting (DE)

(73) Assignee: Construction Research & Technology GmbH, Trostberg (DE)

( * ) Notice: Subject to any disclaimer, the term of this patent is extended or adjusted under 35 U.S.C. 154(b) by 854 days.

This patent is subject to a terminal disclaimer.

(21) Appl. No.: 13/133,022

(22) PCT Filed: Nov. 25, 2009

(86) PCT No.: PCT/EP2009/065787
§ 371 (c)(1),
(2), (4) Date: Oct. 14, 2011

(87) PCT Pub. No.: WO2010/076094
PCT Pub. Date: Jul. 8, 2010

(65) Prior Publication Data
US 2012/0041106 A1   Feb. 16, 2012

(30) Foreign Application Priority Data
Dec. 8, 2008 (EP) .................... 08170969

(51) Int. Cl.
| C04B 24/26 | (2006.01) |
| C08L 29/10 | (2006.01) |
| C08L 33/02 | (2006.01) |
| C08L 35/08 | (2006.01) |
| C04B 103/40 | (2006.01) |

(52) U.S. Cl.
CPC ......... C04B 24/2694 (2013.01); C04B 24/2647 (2013.01); C08L 29/10 (2013.01); C08L 33/02 (2013.01); C08L 35/08 (2013.01); *C04B 2103/408* (2013.01); *C08L 2205/02* (2013.01)
USPC ................ 525/216; 524/5; 524/522; 525/221

(58) Field of Classification Search
CPC ...... C04B 24/2647; C08L 29/10; C08L 35/08
USPC ......................................................... 525/216
See application file for complete search history.

(56) References Cited

U.S. PATENT DOCUMENTS

| 5,362,323 A | 11/1994 | Koyata et al. |
| 6,140,440 A | 10/2000 | Kinoshita et al. |
| 6,777,517 B1 | 8/2004 | Albrecht et al. |
| 2007/0161724 A1 | 7/2007 | Moraru et al. |

FOREIGN PATENT DOCUMENTS

| EP | 0 556 061 A1 | 8/1993 |
| EP | 0 924 174 A1 | 6/1999 |
| WO | WO 00/77058 A1 | 12/2000 |
| WO | WO 2005/075529 A2 | 8/2005 |

OTHER PUBLICATIONS

Mexican Office Action issued Mar. 18, 2014, from the Mexican Institute of Industrial Property.
PCT/EP2009/065787—International Preliminary Report on Patentability, Jun. 14, 2011.
PCT/EP2009/065787—International Search Report, Mar. 17, 2010.
PCT/EP2009/065787—International Written Opinion, Mar. 17, 2010.

*Primary Examiner* — Doris Lee
(74) *Attorney, Agent, or Firm* — Curatolo Sidoti Co., LPA; Joseph G. Curatolo; Salvatore A. Sidoti

(57) ABSTRACT

The invention relates to a polymer composition containing 5 to 95% by weight of a copolymer H and 2 to 60% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, the polyether macromonomer structural units of the copolymer H having side chains containing in each case at least 5 ether oxygen atoms, the number of ether oxygen atoms per side chain of the polyether macromonomer structural units of the copolymer H varying in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima.

19 Claims, No Drawings

DISPERSING AGENT CONTAINING COPOLYMER MIXTURE

CROSS REFERENCE TO RELATED APPLICATIONS

This application is a national stage application of International Application No. PCT/EP2009/065787, filed 25 Nov. 2009, which claims priority from European Patent Application Serial No. 08170969.3, filed 8 Dec. 2008, from which applications priority is claimed, and which are incorporated herein by reference.

The present invention relates to a polymer composition, a dispersant, the preparation of the polymer composition and of the dispersant and the use of the polymer composition.

It is known that admixtures in the form of dispersants are often added to aqueous slurries of powdery inorganic or organic substances, such as clays, silicate powder, chalk, carbon black, crushed rock and hydraulic binders, for improving their workability, i.e. kneadability, spreadability, sprayability, pumpability or flowability. Such admixtures are capable of preventing the formation of solid agglomerates, of dispersing particles which are already present and particles newly formed by hydration and in this way of improving the workability. This effect is utilized in particular in a targeted manner in the preparation of building material mixtures which contain hydraulic binders, such as cement, lime, gypsum, hemihydrate or anhydrite.

In order to convert these building material mixtures based on said binders into a ready-to-use processable form, as a rule substantially more mixing water is required than would be necessary for the subsequent hydration or hardening process. The proportion of cavities formed in the concrete body due to the excess, subsequently evaporating water leads to significantly poorer mechanical strengths and durabilities.

In order to reduce this excess proportion of water at a specified processing consistency and/or to improve the workability at a specified water/binder ratio, admixtures which are generally referred to as water reduction agents or superplasticizers are used. In particular, copolymers which are prepared by free radical copolymerization of acid monomers and/or acid derivative monomers with polyether macromonomers are used in practice as such agents.

WO 2005/075529 describes copolymers which, in addition to acid monomer structural units, have vinyloxybutylenepoly (ethylene glycol) structural units as polyether macromonomer structural units. Such copolymers are widely used as high-performance superplasticizers since they have excellent performance characteristics.

Although the copolymers described are to be regarded as economical high-performance superplasticizers, there continues to be an aspiration to improve further the quality and the cost-efficiency of the copolymers (in particular with regard to robustness and universality).

The object of the present invention is therefore to provide an economical dispersant for hydraulic binders, which is suitable in particular as a superplasticizer for concrete.

The achievement of this object is a polymer composition containing 5 to 95% by weight of a copolymer H and 2 to 60% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, the polyether macromonomer structural units of the copolymer H having side chains containing in each case at least 5 ether oxygen atoms, the number of ether oxygen atoms per side chain of the polyether macromonomer structural units of the copolymer H varying in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima whose abscissa values differ by more than 8 ether oxygen atoms from one another, all polyether macromonomer structural units of the copolymer K having either side chains with a large number of ether oxygen atoms or alternatively side chains with a small number of ether oxygen atoms, side chains with a large number of ether oxygen atoms being those side chains which in each case have more ether oxygen atoms than the sum of the arithmetic mean of the ether oxygen atoms per side chain of the polyether macromonomer structural units of the copolymer H and the number 4, and side chains with a small number of ether oxygen atoms being those side chains which in each case have fewer ether oxygen atoms than the difference between the arithmetic mean of the ether oxygen atoms per side chain of the polyether macromonomer structural units of the copolymer H and the number 4.

The acid monomer structural units are produced by incorporating the corresponding acid monomers in the form of polymerized units. In this context, acid monomer is to be understood as meaning monomers which are capable of free radical copolymerization, have at least one carbon double bond, contain at least one acid function and react as an acid in an aqueous medium. Furthermore, acid monomer is also to be understood as meaning monomers which are capable of free radical copolymerization, have at least one carbon double bond, form at least one acid function as a result of a hydrolysis reaction in an aqueous medium and react as an acid in an aqueous medium (example: maleic anhydride or base-hydrolyzable esters, such as ethyl acrylate). The polyether macromonomer structural units are produced by incorporating the corresponding polyether macromonomers in the form of polymerized units. In this connection, polyether macromonomers are, in the context of the present invention, compounds which are capable of free radical copolymerization and have at least one carbon double bond and which have ether oxygen atoms. The polyether macromonomer structural units present in the copolymer therefore have in each case at least one side chain which contains ether oxygen atoms.

In general, it may be said that the mode of action of relevant copolymers having polyether macromonomer structural units and acid structural units is determined by their structural parameters. The action spectrum of corresponding high-performance copolymers covers the entire range from extreme water reduction to extreme maintenance of consistency, structural parameters which ensure water reduction conflicting with good slump retention. Thus, in addition to the charge quantity per unit mass, the length of the side chains is also decisive, for example with regard to the water reduction capability. The metering of the relevant superplasticizer copolymers is usually carried out as a percentage of the cement weight of a cementitious mixture—i.e. mass-based. As a rule, not only the applied mass but also the number of active substance molecules is decisive for the mode of action. However, long side chains have a high mass, which runs contrary to as large as possible a number of copolymer molecules per unit mass. By targeted incorporation of short side chains in addition to long side chains, the molar mass of the copolymers can be reduced but without adversely affecting the dispersing effect due to the long side chains. Thus, it is frequently expedient to incorporate short and long polyether side chains in each case together in the copolymer molecule and to do so according to the principle of "in each case as many of the longer ones as necessary but as few as possible". Copolymer superplasticizers can be optimized in this way with regard to their mass efficiency. This optimization can be carried out separately for both extremes of the action spectrum (water reduction, maintenance of consistency). In applications where both water reduction and maintenance of consistency are required, a physical mixture of these respective mass-optimized superplasticizer copolymers with copolymers which have either only short or long side chains may be advantageous. Advantages are a greater robustness with respect to cement quality (alkali and sulphate content), temperature variations or the possibility of easy adaptation of the mixture. Stated in simple terms, the polymer composition according to the invention relates to a mixture of a copolymer having mixed side chains with another copolymer which has either only long or only short side chains. Although long polyether side chains result in a good dispersing effect, they lead to a high viscosity in the concrete in the case of a large water reduction (which is generally undesired), short polyether side chains introducing a far lower viscosity. For the respective practical application, a "compromise" with regard to the choice of short and long side chains is frequently optimal, mixtures of short and long side chains frequently giving good results. The present invention realises the manner in which such mixtures are effectively provided: the copolymer having mixed side chains is frequently provided as a sort of standard in relatively large amounts and mixed with a relatively small amount of an either short-chain or long-chain copolymer, so that a desired action profile is achieved. This is also associated, inter alia, with the advantage that relatively little storage and mixing effort is required in order to achieve the desired application profile.

Usually, the polymer composition contains 15 to 80% by weight of a copolymer H and 5 to 40% by weight of a copolymer K.

As a rule, at least 50 mol % of all structural units of the copolymer H and at least 50 mol % of all structural units of the copolymer K are present in each case in the form of acid monomer structural units.

Frequently, the number of ether oxygen atoms per side chain of the polyether macromonomer structural units of the copolymer H varies in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima whose abscissa values differ by more than 10 ether oxygen atoms from one another.

The number of ether oxygen atoms per side chain of the polyether macromonomer structural units of the copolymer H varies in many embodiments in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima whose abscissa values differ from one another by more than 10 ether oxygen atoms, all polyether macromonomer structural units of the copolymer K having either side chains with a large number of ether oxygen atoms or alternatively side chains with a small number of ether oxygen atoms, side chains with a large number of ether oxygen atoms being those side chains which in each case have more ether oxygen atoms than the sum of the arithmetic mean of the ether oxygen atoms per side chain of the polyether macromonomer structural units of the copolymer H and the number 10, and side chains with a small number of ether oxygen atoms being those side chains which in each case have fewer ether oxygen atoms than the difference between the arithmetic mean of the ether oxygen atoms per side chain of the polyether macromonomer structural units of the copolymer H and the number 10.

Preferably, the acid monomer structural units of the copolymers H and K are present in each case according to one of the general formulae (Ia), (Ib), (Ic) and/or (Id)

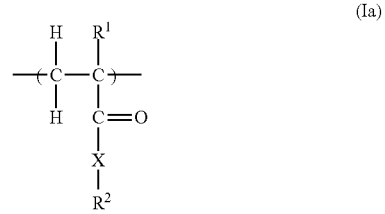

(Ia)

where
$R^1$ are identical or different and are represented by H and/or a straight-chain or a branched $C_1$-$C_4$ alkyl group;
X are identical or different and are represented by NH—$(C_nH_{2n})$ where n=1, 2, 3 or 4 and/or O—$(C_nH_{2n})$ where n=1, 2, 3 or 4 and/or by a unit not present;
$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

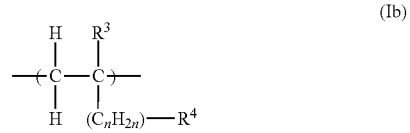

(Ib)

where
$R^3$ are identical or different and are represented by H and/or a straight-chain or branched $C_1$-$C_4$ alkyl group;
n=0, 1, 2, 3 or 4;
$R^4$ are identical or different and are represented by $SO_3H$, $PO_3H_2$, O—$PO_3H_2$ and/or para-substituted $C_6H_4$—$SO_3H$;

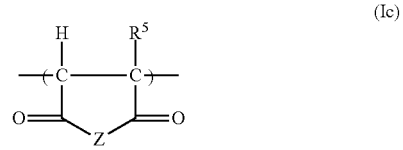

(Ic)

where
$R^5$ are identical or different and are represented by H and/or a straight-chain or branched $C_1$-$C_4$ alkyl group;
Z are identical or different and are represented by O and/or NH;

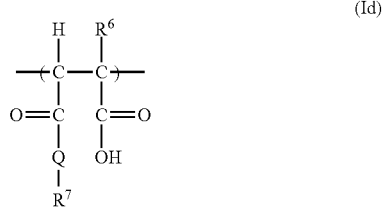

(Id)

where
$R^6$ are identical or different and are represented by H and/or a straight-chain or branched $C_1$-$C_4$ alkyl group;

Q are identical or different and are represented by NH and/or O;

$R^7$ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^9$ where m=0, 1, 2, 3 or 4, e=0, 1, 2, 3 or 4, $A'=C_{x'}H_{2x'}$, where x'=2, 3, 4 or 5 and/or $CH_2C(C_6H_5)H$—, $\alpha$=an integer from 1 to 350 with $R^9$ identical or different and represented by a straight-chain or a branched $C_1$-$C_4$ alkyl group.

As a rule, the acid monomer structural units of the copolymers H and K are produced in each case by incorporation of the acid monomers methacrylic acid, acrylic acid, maleic acid, maleic anhydride and/or monoesters of maleic acid in the form of polymerized units.

Depending on the pH, the acid monomer structural units can also be present in deprotonated form as a salt, in which case typical counterions are $Na^+$, $K^+$ and $Ca^{2+}$.

In general, the polyether macromonomer structural units of the copolymers H and K are present in each case according to one of the general formulae (IIa), (IIb) and/or (IIc)

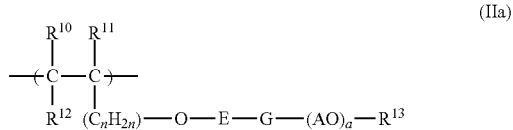
(IIa)

where $R^{10}$, $R^{11}$ and $R^{12}$ in each case are identical or different and, independently of one another, are represented by H and/or a straight-chain or a branched $C_1$-$C_4$ alkyl group;

E are identical or different and are represented by a straight-chain or branched $C_1$-$C_6$ alkylene group, a cyclohexyl group, $CH_2$—$C_6H_{10}$, ortho-, meta- or para-substituted $C_6H_4$ and/or a unit not present;

G are identical or different and are represented by O, NH and/or CO—NH, with the proviso that, if E is a unit not present, G is also present as a unit not present;

A are identical or different and are represented by $C_xH_{2x}$ where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 5 to 350 (preferably 10-200);

$R^{13}$ are identical or different and are represented by H, a straight-chain or a branched $C_1$-$C_4$ alkyl group, CO—$NH_2$ and/or $COCH_3$;

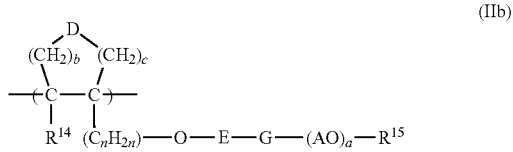
(IIb)

where $R^{14}$ are identical or different and are represented by H and/or a straight-chain or a branched $C_1$-$C_4$ alkyl group;

E are identical or different and are represented by a straight-chain or a branched $C_1$-$C_6$ alkylene group, a cyclohexyl group, $CH_2$—$C_6H_{10}$, ortho-, meta- or para-substituted $C_6H_4$ and/or by a unit not present;

G are identical or different and are represented by a unit not present, O, NH and/or CO—NH, with the proviso that, if E is a unit not present, G is also present as a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

a are identical or different and are represented by an integer from 5 to 350;

D are identical or different and are represented by a unit not present, NH and/or O, with the proviso that, if D is a unit not present: b=0, 1, 2, 3 or 4 and c=0, 1, 2, 3 or 4, where b+c=3 or 4, and with the proviso that, if D is NH and/or O: b=0, 1, 2 or 3, c=0, 1, 2 or 3, where b+c=2 or 3;

$R^{15}$ are identical or different and are represented by H, a straight-chain or a branched $C_1$-$C_4$ alkyl group, CO—$NH_2$, and/or $COCH_3$;

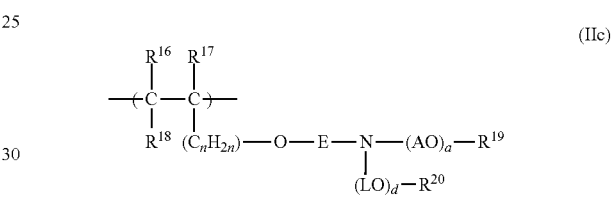
(IIc)

where $R^{16}$, $R^{17}$ and $R^{18}$ in each case are identical or different and, independently of one another, are represented by H and/or a straight-chain or a branched $C_1$-$C_4$ alkyl group;

E are identical or different and are represented by a straight-chain or a branched $C_1$-$C_6$ alkylene group, a cyclohexyl group, $CH_2$—$C_6H_{10}$ and/or ortho-, meta- or para-substituted $C_6H_4$;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 and/or $CH_2$—$CH(C_6H_5)$;

a are identical or different and are represented by an integer from 5 to 350;

d are identical or different and are represented by an integer from 1 to 350;

$R^{19}$ are identical or different and are represented by H and/or a straight-chain or branched $C_1$-$C_4$ alkyl group;

$R^{20}$ are identical or different and are represented by H and/or a straight-chain $C_1$-$C_4$ alkyl group.

Typically, the polyether macromonomer structural units of the copolymers H and K are produced in each case by incorporation of the polyether macromonomers alkoxylated hydroxybutyl vinyl ether and/or alkoxylated diethylene glycol monovinyl ether and/or alkoxylated isoprenol and/or alkoxylated (meth)allyl alcohol and/or vinylated methylpolyalkylene glycol having preferably in each case an arithmetic mean of 6 to 300 oxyalkylene groups in the form of polymerized units.

The alkoxy units of the polyether macromonomers are present as a rule as ethoxy groups or as a mixture of ethoxy and propoxy groups (these polyether macromonomers are obtainable from the ethoxylation or propoxylation of the corresponding monomer alcohols).

The copolymers H and K may have in each case the same or different types of polyether macromonomer structural units and/or acid monomer structural units.

In general, in each case at least 45 mol %, preferably at least 80 mol %, of all structural units of the copolymers H and K are produced by incorporation of acid monomer and polyether macromonomer in the form of polymerized units.

Furthermore, the invention also relates to a dispersant containing at least 30% by weight of water and at least 10% by weight of the polymer composition described above.

The dispersant is preferably present in the form of an aqueous solution.

The invention also relates to a process for the preparation of the polymer composition described above and of the dispersant described above, in which the copolymers H and K are each prepared separately from one another in aqueous solution and the separately prepared copolymers or the separately prepared aqueous solutions are then mixed with one another. As a rule, acid monomer and polyether macromonomer are reacted by free radical polymerization with the use of a peroxide-containing redox initiator system in aqueous solution, the temperature of the aqueous solution during the polymerization being 10 to 45° C. and the pH being 3.5 to 6.5.

Finally, the invention also relates to the use of the polymer composition described above as a dispersant for hydraulic binders and/or for latent hydraulic binders. The polymer composition according to the invention can also be used, for example (particularly in dewatered form), as an additive for cement production (grinding aid and "water reducer" for fine Portland cements or composite cements).

Below, the invention is to be explained in more detail with reference to working examples.

SYNTHESIS EXAMPLE 1

250.0 g of deionized water and 330.0 g of vinyloxybutylpolyethylene glycol-1100 (adduct of 22 mol of ethylene oxide with 4-hydroxybutyl 1-monovinyl ether) were initially taken in a glass reactor—equipped with stirrer, pH electrode and a plurality of feed devices—and cooled to a temperature of 15° C.

In a separate feed vessel, 64.9 g of acrylic acid and 34.3 g of 40% strength potassium hydroxide solution were mixed homogeneously with 187.4 g of deionized water with cooling. 2.43 g of 3-mercaptopropionic acid were then added (solution A).

At the same time, a 3% strength solution of Brüggolit® FF6 (commercial product from Brüggemann GmbH) in water was prepared (solution B).

107.8 g of solution A and then 17.4 g of a 20% strength aqueous sodium hydroxide solution and 0.61 g of 3-mercaptopropionic acid were added to the initially taken mixture with stirring and cooling.

Thereafter, 0.093 g of iron(II) sulphate heptahydrate was added to the initially taken mixture and the reaction was started by adding 5.74 g of hydrogen peroxide (30% in water) to the initially taken mixture. At the same time, the addition of solution A and solution B to the stirred initially taken mixture was begun.

The metering rate of the remaining solution A is shown in the metering profile below.

| | t (min) | | | | | | | |
|---|---|---|---|---|---|---|---|---|
| | 0 | 1.5 | 3 | 6 | 9 | 12 | 15 | 18 |
| Solution A (g/h) | 131 | 261 | 457 | 547 | 509 | 457 | 392 | 314 |
| | t (min) | | | | | | | |
| | 21 | 24 | 27 | 30 | 33 | 36 | 39 | 45 |
| Solution A (g/h) | 248 | 193 | 155 | 116 | 94 | 65 | 57 | 0 |

Solution B was metered during the metering of solution A at a constant metering rate of 37 g/h and further metered after the end of the metering of solution A until the reaction mixture was free of peroxide.

During the reaction time, 20% strength aqueous sodium hydroxide solution was added stepwise as required in order to keep the pH at least 5.65.

The polymer solution obtained was then adjusted to a pH of 6.5 with 20% strength sodium hydroxide solution The resulting copolymer was obtained in a slightly yellowish solution which had a solids content of 39.0%. The weight average molar mass of the copolymer was 39000 g/mol; total conversion (determined by means of GPC) 94%.

SYNTHESIS EXAMPLE 2

208.0 g of deionized water and 229.2 g of vinyloxybutylpolyethylene glycol-1100 (adduct of 22 mol of ethylene oxide with 4-hydroxybutyl 1-monovinyl ether) and 104.2 g of vinyloxybutylpolyethylene glycol-500 (adduct of 10 mol of ethylene oxide with 4-hydroxybutyl 1-monovinyl ether) were initially taken in a glass reactor—equipped with stirrer, pH electrode and a plurality of feed devices—and cooled to 12° C. (initially taken mixture).

In a separate feed vessel, 33.1 g of acrylic acid, 26.1 g of 2-hydroxypropyl acrylate and 19.6 g of a 40% strength potassium hydroxide solution were homogeneously mixed with 180.4 g of deionized water with cooling. 2.64 g of 3-mercaptopropionic acid were then added (solution A).

At the same time, a 3% strength solution of Brüggolit® FF6 (commercial product from Brüggemann GmbH) in water was prepared (solution B).

78.0 g of solution A, 0.6 g of a 25% strength aqueous sulphuric acid and 1.4 g of 3-mercaptopropionic acid were added to the initially taken mixture with stirring and cooling.

After this pH had been reached, 0.078 g of iron(II) sulphate heptahydrate was added and the reaction was started by adding 4.8 g of hydrogen peroxide (30% in water). At the same time, the addition of solution A and solution B to the stirred initially taken mixture was begun.

The rate of addition of the remaining solution A is shown in the metering profile below.

| | t (min) | | | | | | | |
|---|---|---|---|---|---|---|---|---|
| | 0 | 1.5 | 3 | 6 | 9 | 12 | 15 | 18 |
| Solution A (g/h) | 125 | 250 | 437 | 523 | 487 | 437 | 374 | 299 |
| | t (min) | | | | | | | |
| | 21 | 24 | 27 | 30 | 33 | 36 | 39 | 45 |
| Solution A (g/h) | 237 | 185 | 148 | 111 | 90 | 62 | 55 | 0 |

Solution B was metered during the metering of solution A at a constant metering rate of 31 g/h and was further metered after the end of the metering of solution A until the reaction mixture was free of peroxide.

During the reaction time, 7.6 g of a 20% strength aqueous sodium hydroxide solution were added stepwise in order to keep the pH at least 5.7.

The polymer solution obtained was then adjusted to a pH of 6.5 with about 20% strength sodium hydroxide solution.

The resulting copolymer was obtained in a slightly yellowish solution which had a solids content of 45.0%. The weight average molar mass of the copolymer was 27000 g/mol; total conversion (determined by means of GPC): 98%.

The performance characteristics of the copolymer are to be illustrated by the following use examples.

USE EXAMPLES

A self-compacting concrete (referred to below as SCC) was deliberately chosen as a use example since this type of concrete has become enormously important in recent years owing to the absence of vibration. Superplasticizers for self-compacting concrete must be particularly robust and adaptable since, for example in the case of a premature loss of consistency, the flowability of the concrete is greatly reduced and hence the uniform filling of the concrete formwork can no longer be ensured.

The SCC was prepared according to the following ratios:

| Component | Amount/kg/m$^3$ |
|---|---|
| Cement CEM I 52.5 R | 310 |
| Limestone powder | 218 |
| Sand 0-4 mm | 670 |
| Gravel 4-16 mm | 970 |
| Water | 189 |
| Superplasticizer | As required |

All dry components were premixed for 30 seconds in a compulsory mixer, after which the water and the superplasticizer were added and mixed for 4 minutes. The fresh concrete properties were determined over time by determining the slump without blocking ring.

First, the particular robustness of the polymer composition with respect to the use of cements of type I 52.5R of different manufacturers is to be described below. The concretes were prepared with the use of two cements of type CEM I 52.5R of different manufacturers according to the procedure described above.

| Cement CEM I 52.5 R of the manufacturer | Polymer composition[1] | Dose[2] | Slump in cm | | |
|---|---|---|---|---|---|
| | | | 0 min | 60 min | 90 min |
| 1 | A1 | 0.20% | 71 | 61 | 51 |
| 2 | A1 | 0.68% | 70 | 71 | 71 |
| 1 | B1 | 0.27% | 71 | 71 | 70 |
| 2 | B1 | 0.35% | 70 | 70 | 70 |

[1]Polymer A1: Comparative example with high-performance superplasticizer Glenium ® 27 (commercial product of BASF SE); Polymer B1: physical mixture of polymer according to synthesis Example 1 and polymer according to synthesis Example 2, mixing ratio (amount) 1:2;
[2]Dose data in percent by mass of polymer solid, based on the weight of cement taken From the above examples, it is clear that the metered amount of polymer A1 depends to a very great extent on the type of cement used. Thus, with the use of cement 1, a good initial slump can be obtained with an economical dose, but the consistency loss over 90 minutes is substantial. With the use of cement 2, both a good initial slump and good maintenance of consistency can be achieved but an extremely large amount of superplasticizer has to be metered for this purpose (340% compared with concrete with cement 1). In the case of the polymer composition B1 according to the invention, a good initial slump and optimum maintenance of consistency can be achieved both with the use of cement 1 and with the use of cement 2. The very small differences in the required metered amount in comparison with the use examples with polymer A1 (cement 2: 130% compared with concrete with cement 1) should be singled out in particular. This means a high cost-efficiency of the polymer mixture and considerable flexibility with respect to different cements.

In particular, the progressive reduction of the $CO_2$ emissions in cement production by the use of secondary fuels as well as naturally occurring variations in the clinker composition frequently result in variations in the cement quality. The polymer mixtures according to the invention also permit a rapid and simple adaptation to these quality variations. This is to be clearly illustrated below.

On the basis of the concrete formulation described above, the various SCC were prepared with different production batches of the cement from manufacturer 1 and the performance characteristics were determined:

| Cement CEM I 52.5 R from manufacturer 1, batch | Polymer composition[1] | Dose[2] | Slump in cm | | |
|---|---|---|---|---|---|
| | | | 0 min | 60 min | 90 min |
| 1 | B1 | 0.27% | 71 | 71 | 70 |
| 2 | B1 | 0.27% | >75 cm, segregation | | |
| 2 | B1 | 0.25% | >75 cm, segregation | | |
| 2 | B2 | 0.25% | 71 | 69 | 69 |

[1]Polymer B1: physical mixture of polymer according to synthesis Example 1 and polymer according to synthesis Example 2, mixing ratio (amount) 1:2; Polymer B2, physical mixture of polymer according to synthesis example 1 and polymer according to synthesis Example 2, mixing ratio (amount) 0.9:2.1;
[2]Dose data in percent by mass of polymer solid, based on the weight of cement taken With an identical dose of polymer composition B1, the concrete with cement batch 2 is more greatly segregated, as it is after a reduction of the polymer dose. By a slight adaptation of the mixing ratios of the polymers according to synthesis Examples 1 and 2 (resulting in: polymer composition B2), a good slump and optimum maintenance of consistency can once again be achieved. This would not be possible with the use of superplasticizer containing only one polymer. A good initial slump could be achieved by reducing the dose but this would be associated with a progressive loss of consistency over time.

The use examples thus illustrate the particular cost-efficiency of the polymer composition according to the invention.

The invention claimed is:
1. Polymer composition containing 5 to 95% by weight of a copolymer H and 2 to 60% by weight of a copolymer K, the copolymers H and K each having polyether macromonomer structural units and acid monomer structural units, which are present in the copolymers H and K in each case in a molar ratio of 1:20 to 1:1, and at least 20 mol % of all structural units of the copolymer H and at least 25 mol % of all structural units of the copolymer K being present in each case in the form of acid monomer structural units, the polyether macromonomer structural units of the copolymer H having side chains containing in each case at least 5 ether oxygen atoms, the number of ether oxygen atoms per side chain of the polyether mac- romonomer structural units of the copolymer H varying in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima whose abscissa values differ by more than 8 ether oxygen atoms from one another, all polyether macromonomer structural units of the copolymer K having either side chains with a large number of ether oxygen atoms or alternatively side chains with a small number of ether oxygen atoms, side chains with a large number of ether oxygen atoms being those side chains which in each case have more ether oxygen atoms than the sum of the arithmetic mean of the ether oxygen atoms per side chain of the polyether macromonomer structural units of the copolymer H and the number 4, and side chains with a small number of ether oxygen atoms being those side chains which in each case have fewer ether oxygen atoms than the difference between the arithmetic mean of the ether oxygen atoms per side chain of the polyether macromonomer structural units of the copolymer H and the number 4.

2. Polymer composition according to claim 1, containing 15 to 80% by weight of a copolymer H and 5 to 40% by weight of a copolymer K.

3. Polymer composition according to claim 1, wherein at least 50 mol % of all structural units of the copolymer H and at least 50 mol % of all structural units of the copolymer K are present in each case in the form of acid monomer structural units.

4. Polymer composition according to claim 1, wherein the number of ether oxygen atoms per side chain of the polyether macromonomer structural units of the copolymer H varies in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima whose abscissa values differ by more than 10 ether oxygen atoms from one another.

5. Polymer composition according to claim 1, wherein the number of ether oxygen atoms per side chain of the polyether macromonomer structural units of the copolymer H varies in such a way that the corresponding frequency distribution diagram, in which the number of ether oxygen atoms per side chain of a polyether macromonomer structural unit is plotted along the abscissa and the associated frequency for the copolymer H is plotted along the ordinate, contains at least 2 maxima whose abscissa values differ from one another by more than 10 ether oxygen atoms, all polyether macromonomer structural units of the copolymer K having either side chains with a large number of ether oxygen atoms or alternatively side chains with a small number of ether oxygen atoms, side chains with a large number of ether oxygen atoms being those side chains which in each case have more ether oxygen atoms than the sum of the arithmetic mean of the ether oxygen atoms per side chain of the polyether macromonomer structural units of the copolymer H and the number 10, and side chains with a small number of ether oxygen atoms being those side chains which in each case have fewer ether oxygen atoms than the difference between the arithmetic mean of the ether oxygen atoms per side chain of the polyether macromonomer structural units of the copolymer H and the number 10.

6. Polymer composition according to claim 1, wherein the acid monomer structural units of the copolymers H and K are present in each case according to one of the general formulae (Ia), (Ib), (Ic) and/or (Id)

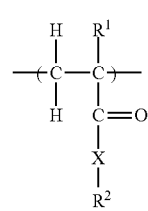
(Ia)

where
$R^1$ are identical or different and are represented by H and/or a straight-chain $C_1$-$C_4$ alkyl group or a branched $C_3$-$C_4$ alkyl group;
X are identical or different and are represented by NH—$(C_nH_{2n})$ where n=1, 2, 3 or 4 and/or O—$(C_nH_{2n})$ where n=1, 2, 3 or 4 and/or by a unit not present;
$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

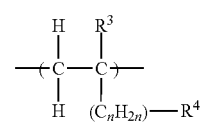
(Ib)

where
$R^3$ are identical or different and are represented by H and/or a straight-chain $C_1$-$C_4$ alkyl group or a branched $C_3$-$C_4$ alkyl group;
n=0, 1, 2, 3 or 4;
$R^4$ are identical or different and are represented by $SO_3H$, $PO_3H_2$, O—$PO_3H_2$ and/or para-substituted $C_6H_4$—$SO_3H$;

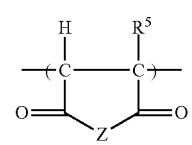
(Ic)

where
$R^5$ are identical or different and are represented by H and/or a straight-chain $C_1$-$C_4$ alkyl group or a branched $C_3$-$C_4$ alkyl group;
Z are identical or different and are represented by O and/or NH;

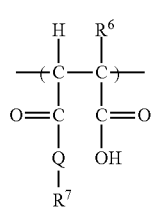
(Id)

where
$R^6$ are identical or different and are represented by H and/or a straight-chain $C_1$-$C_4$ alkyl group or a branched $C_3$-$C_4$ alkyl group;

Q are identical or different and are represented by NH and/or O;

R$^7$ are identical or different and are represented by H, $(C_nH_{2n})$—SO$_3$H where n=0, 1, 2, 3 or 4, $(C_nH_{2n})$—OH where n=0, 1, 2, 3 or 4; $(C_nH_{2n})$—PO$_3$H$_2$ where n=0, 1, 2, 3 or 4, $(C_nH_{2n})$—OPO$_3$H$_2$ where n=0, 1, 2, 3 or 4, $(C_6H_4)$—SO$_3$H, $(C_6H_4)$—PO$_3$H$_2$, $(C_6H_4)$—OPO$_3$H$_2$ and/or $(C_mH_{2m})_e$—O-(A'O)$_\alpha$—R$^9$ where m=0, 1, 2, 3 or 4, e=0, 1, 2, 3 or 4, A'=C$_{x'}$H$_{2x'}$ where x'=2, 3, 4 or 5 and/or CH$_2$C(C$_6$H$_5$)H—, α=an integer from 1 to 350 with R$^9$ identical or different and represented by a straight-chain C$_1$-C$_4$ alkyl group or a branched C$_3$-C$_4$ alkyl group.

7. Polymer composition according to claim 1, wherein the acid monomer structural units of the copolymers H and K are produced in each case by incorporation of the acid monomers methacrylic acid, acrylic acid, maleic acid, maleic anhydride and/or monoesters of maleic acid in the form of polymerized units.

8. Polymer composition according to claim 1, wherein the polyether macromonomer structural units of the copolymers H and K are present in each case according to one of the general formulae (IIa), (IIb) and/or (IIc)

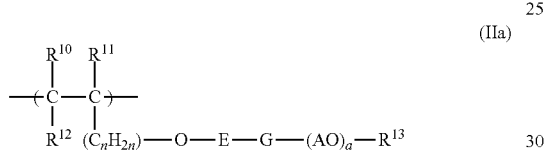
(IIa)

where

R$^{10}$, R$^{11}$ an R$^{12}$ in each case are identical or different and, independently of one another, are represented by H and/or a straight-chain C$_1$-C$_4$ alkyl group or a branched C$_3$-C$_4$ alkyl group;

E are identical or different and are represented by a straight-chain C$_1$-C$_6$ alkylene group or branched C$_3$-C$_6$ alkylene group, a cyclohexyl group, CH$_2$—C$_6$H$_{10}$, ortho-substituted C$_6$H$_4$, meta-substituted C$_6$H$_4$ or para-substituted C$_6$H$_4$ and/or a unit not present;

G are identical or different and are represented by O, NH and/or CO—NH, with the proviso that, if E is a unit not present, G is also a unit not present;

A are identical or different and are represented by C$_x$H$_{2x}$ where x=2, 3, 4 and/or 5 and/or CH$_2$CH(C$_6$H$_5$);

n are identical or different and are represented by 0, 1, 2, 3, 4 and/or 5;

a are identical or different and are represented by an integer from 5 to 350;

R$^{13}$ are identical or different and are represented by H, a straight-chain C$_1$-C$_4$ alkyl group or a branched C$_3$-C$_4$ alkyl group, CO—NH$_2$ and/or COCH$_3$;

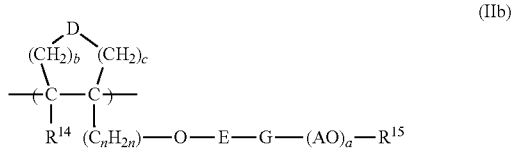
(IIb)

where

R$^{14}$ are identical or different and are represented by H and/or a straight-chain C$_1$-C$_4$ alkyl group or a branched C$_3$-C$_4$ alkyl group;

E are identical or different and are represented by a straight-chain C$_1$-C$_6$ alkylene group or branched C$_3$-C$_6$ alkylene group, a cyclohexyl group, CH$_2$—C$_6$H$_{10}$, ortho-substituted C$_6$H$_4$, meta-substituted C$_6$H$_4$ or para-substituted C$_6$H$_4$ and/or by a unit not present;

G are identical or different and are represented by a unit not present, O, NH and/or CO—NH, with the proviso that, if E is a unit not present, G is also a unit not present;

A are identical or different and are represented by C$_x$H$_{2x}$ where x=2, 3, 4 and/or 5 and/or CH$_2$CH(C$_6$H$_5$);

n are identical or different and are represented by 0, 1, 2, 3, 4 and/or 5;

a are identical or different and are represented by an integer from 5 to 350;

D are identical or different and are represented by a unit not present, NH and/or O, with the proviso that, if D is a unit not present: b=0, 1, 2, 3 or 4 and c=0, 1, 2, 3 or 4, where b+c=3 or 4, and with the proviso that, if D is NH and/or O: b=0, 1, 2 or 3, c=0, 1, 2 or 3, where b+c=2 or 3;

R$^{15}$ are identical or different and are represented by H, a straight-chain C$_1$-C$_4$ alkyl group or a branched C$_3$-C$_4$ alkyl group, CO—NH$_2$, and/or COCH$_3$;

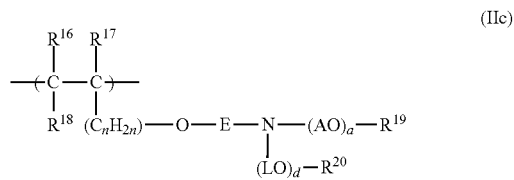
(IIc)

where

R$^{16}$, R$^{17}$ and R$^{18}$ in each case are identical or different and, independently of one another, are represented by H and/or a straight-chain C$_1$-C$_4$ alkyl group or a branched C$_3$-C$_4$ alkyl group;

E are identical or different and are represented by a straight-chain C$_1$-C$_6$ alkylene group or branched C$_3$-C$_6$ alkylene group, a cyclohexyl group, CH$_2$—C$_6$H$_{10}$ and/or ortho-substituted C$_6$H$_4$, meta-substituted C$_6$H$_4$ or para-substituted C$_6$H$_4$;

A are identical or different and are represented by C$_x$H$_{2x}$ where x=2, 3, 4 and/or 5 and/or CH$_2$CH(C$_6$H$_5$);

n are identical or different and are represented by 0, 1, 2, 3, 4 and/or 5;

L are identical or different and are represented by C$_x$H$_{2x}$ where x=2, 3, 4 and/or 5 and/or CH$_2$—CH(C$_6$H$_5$);

a are identical or different and are represented by an integer from 5 to 350;

d are identical or different and are represented by an integer from 1 to 350;

R$^{19}$ are identical or different and are represented by H and/or a straight-chain C$_1$-C$_4$ alkyl group or a branched C$_3$-C$_4$ alkyl group;

R$^{20}$ are identical or different and are represented by H and/or a straight-chain C$_1$-C$_4$ alkyl group.

9. Polymer composition according to claim 1, wherein the polyether macromonomer structural units of the copolymers H and K are produced in each case by incorporation of the polyether macromonomers alkoxylated hydroxybutyl vinyl ether and/or alkoxylated isoprenol and/or alkoxylated (meth) allyl alcohol and/or vinylated methylpolyalkylene glycol.

10. Polymer composition according to claim 1, wherein the copolymers H and K have in each case the same or different types of polyether macromonomer structural units and/or acid monomer structural units.

11. Polymer composition according to claim 1, wherein in each case at least 45 mol % of all structural units of the copolymers H and K are produced by incorporation of acid monomer and polyether macromonomer in the form of polymerized units.

12. Polymer composition according to claim 1, wherein the polyether macromonomer structural units of the copolymers H and K are produced in each case by incorporation of the polyether macromonomers alkoxylated hydroxybutyl vinyl ether and/or alkoxylated isoprenol and/or alkoxylated (meth)allyl alcohol and/or vinylated methylpolyalkylene glycol having in each case an arithmetic mean of 6 to 300 oxyalkylene groups in the form of polymerized units.

13. Polymer composition according to any claim 1, wherein in each case at least 80 mol % of all structural units of the copolymers H and K are produced by incorporation of acid monomer and polyether macromonomer in the form of polymerized units.

14. Process for the preparation of a polymer composition according to claim 1, wherein the copolymers H and K are each prepared separately from one another in aqueous solution and the separately prepared copolymers or the separately prepared aqueous solutions are then mixed with one another.

15. Process according to claim 14, wherein acid monomer and polyether macromonomer are reacted by free radical polymerization with the use of a peroxide-containing redox initiator system in aqueous solution, the temperature of the aqueous solution during the polymerization being 10 to 45° C. and the pH being 3.5 to 6.5.

16. Process of use of a polymer composition according to claim 1 comprising adding the polymer composition as a dispersant to an aqueous slurry of hydraulic binder and/or of latent hydraulic binder.

17. Dispersant containing at least 30% by weight of water and at least 10% by weight of the polymer composition according to claim 1.

18. Dispersant according to claim 17, which is present in the form of an aqueous solution.

19. Process for the preparation of a dispersant according to claim 17, wherein the copolymers H and K are each prepared separately from one another in aqueous solution and the separately prepared copolymers or the separately prepared aqueous solutions are then mixed with one another.

* * * * *